Nov. 11, 1930.  W. P. MASON  1,781,469
WAVE FILTER
Filed June 25, 1927   2 Sheets-Sheet 1

INVENTOR:
WARREN P. MASON
BY
ATTORNEY

Nov. 11, 1930.  W. P. MASON  1,781,469
WAVE FILTER
Filed June 25, 1927   2 Sheets-Sheet 2

INVENTOR:
WARREN P. MASON
By Joel A. Palmer
ATTORNEY

Patented Nov. 11, 1930

1,781,469

UNITED STATES PATENT OFFICE

WARREN P. MASON, OF EAST ORANGE, NEW JERSEY, ASSIGNOR TO BELL TELEPHONE LABORATORIES, INCORPORATED, OF NEW YORK, N. Y., A CORPORATION OF NEW YORK

WAVE FILTER

Application filed June 25, 1927. Serial No. 201,535.

This invention relates to wave filters and particularly to wave filters of the type characterized by a plurality of transmission bands.

The theory of wave filters and the principles of their design have been developed largely with reference to electric systems, but it is well known that the same principles are in general applicable to wave transmission systems of any type, regardless of the nature of the wave transmitting medium. The essential characteristic property of a filter system is that it should comprise a chain of coupled discrete elements which differ among themselves in the manner in which they store energy. For the most complete realization of the filter properties it is necessary that the elements of the system be substantially non-dissipative.

Heretofore filter structures have for the most part comprised elements adapted to store energy in only one manner, that is either as kinetic energy or as potential energy. For example in electrical systems the elements have comprised simple inductances and capacities, and in mechanical systems simple masses and springs.

In accordance with the present invention wave filters of novel structure and improved characteristics are provided by employing structural elements of a more complex character in which both types of energy may be stored simultaneously. Such structures are characterized by a continuous space distribution of the impedance properties corresponding to the storage of the two kinds of energy, for example, inductance and capacity in an electrical system, or mass and elasticity in a mechanical system.

In one embodiment the invention comprises an electric wave filter in which the elements comprise sections of lines in which inductance and capacity are uniformly distributed, or artificial structures equivalent thereto. These elements are connected into the system by one of their two pairs of terminals, the other pair of terminals being open circuited or short circuited according to the result desired.

In another embodiment the invention comprises an acoustic wave filter in the form of a tubular sound conduit with side branches also in the form of tubes. In this case the columns of air in the tubes constitute sections of acoustic lines with distributed impedance constants, since the properties of mass and elasticity are simultaneously present at all points in the air.

A feature of the invention lies in the proportioning of filter elements with respect to each other to provide a series of uniformly wide transmission bands with their centers spaced in harmonic relation.

Another feature is the alternate occurrence of transmission bands and attenuation bands having infinite attenuation at harmonically spaced frequencies.

These and other features of the invention will be more readily understood by reference to the following detailed description in connection with the drawings in which.

The basic principles of wave propagation in recurrent structures, or artificial lines, are well known. For an exposition of these principles as applied to wave filters reference is made to the following articles: Physical theory of the electric wave filter, by G. A. Campbell, Bell System Technical Journal, Vol. I, No. 2; and Transmission characteristics of electric wave filters, by O. J. Zobel, Bell System Technical Journal, Vol. III, No. 4, October 1924.

Figure 1:
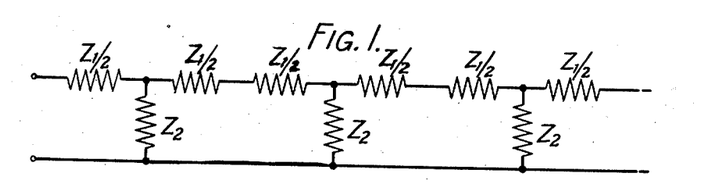
Fig. 1 shows a generalized ladder type sectionalized transmission line.

Any recurrent line structure may be divided up into equal symmetrical sections and the properties of the whole line may be expressed in terms of parameters of the individual section. In Fig. 1 a general recurrent structure is shown divided into equal sections each in the form of a symmetrical T. If the structure is of the familiar series-shunt, or "ladder", type the branches of the T sections will correspond to the actual structural impedance elements. If the structure is of other type the symmetrical sections into which it can be divided may still be represented by an equivalent T system, although the values of the component impedances may be such that they cannot be realized in any physical structure. The propagation constant, per section of the line, and the characteristic impedance are given by the following formulæ:

Propagation constant $$P = \log_e\left[\left(1 + \frac{Z_1}{2Z_2}\right) + \sqrt{\left(1 + \frac{Z_1}{2Z_2}\right)^2 - 1}\right]$$
$$= \cosh^{-1}\left(1 + \frac{Z_1}{2Z_2}\right) \quad (1)$$
$$= \tanh^{-1}\sqrt{\frac{Z_c}{Z_o}} \quad (2)$$

Characteristic impedance $$K = \sqrt{Z_1 Z_2 \left(1 + \frac{Z_1}{4Z_2}\right)} \quad (3)$$
$$= \sqrt{Z_c Z_o}$$

In the foregoing formulæ $Z_1$ and $Z_2$ are respectively the full series branch and the full shunt branch impedances of the "ladder" type structure, or the equivalent impedances if the line is not of the ladder type. The impedances $Z_c$ and $Z_o$ are respectively the closed circuit and the open circuit impedances of the symmetrical sections into which the line may be divided. The formula for the characteristic impedance in terms of $Z_1$ and $Z_2$ assumes that the line is divided into symmetrical T sections as shown, or in other terms, that each section is terminated midseries.

These formulæ are of general application; in the theory of wave filters the component impedances are assumed to be non-dissipative in which case the quantities involved in the formulæ are all pure imaginaries. The selective properties of a wave filter are defined by the variation with frequency of the propagation constant and the characteristic impedance. A consequence of the assumption that the component impedances are non-dissipative is that the values of the propagation constant P and the characteristic impedance K may be either real quantities or else imaginary; they cannot be complex. When the propagation constant has a real value it indicates that currents passing through the line are attenuated. When the value is imaginary it indicates that the waves are transmitted without attenuation but with a change of phase. The change from a real to an imaginary value of the propagation constant marks the transition from an attenuating condition to a condition of free transmission and vice versa. The transmission ranges are also indicated by the characteristic impedance having a real value, pure resistance; this is readily understood when it is considered that an infinite filter can absorb wave energy only when its impedance is resistive.

In dealing with series-shunt types of line it is most convenient to discuss the transmission characteristics in terms of $Z_1$ and $Z_2$. The propagation constant is a function of the ratio $$\frac{Z_1}{Z_2},$$

and may vary with frequency in any manner, depending upon the character of the two impedances. At those frequencies for which the ratio has a value lying between 0 and $-4$ there exists a transmission band, the propagation constant being a pure imaginary. At frequencies for which the ratio has values outside these limits, the line attenuates. The requirements for the existence of a transmission band are, therefore, that the series impedance and the shunt impedance are of opposite sign, and that the value of the series impedance is less than four times the shunt impedance value.

Expressed in terms of the open circuit and short-circuit impedances of the symmetrical section, the condition for the existence of a transmission band is simply that the product of these two impedances is positive.

Figure 2:
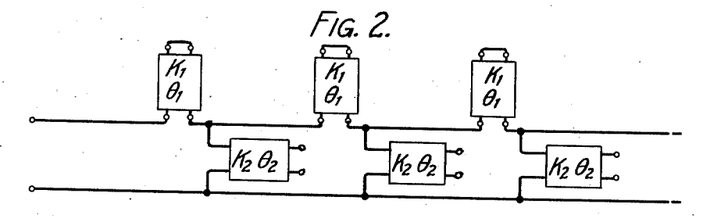
Fig. 2 shows a low-pass wave filter of the invention.
Figure 3:
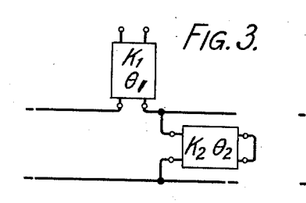
Figs. 3 and 4 show different forms of band-pass wave filters.
Figure 4:
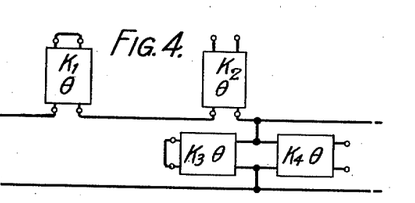
Figures 5, 6:
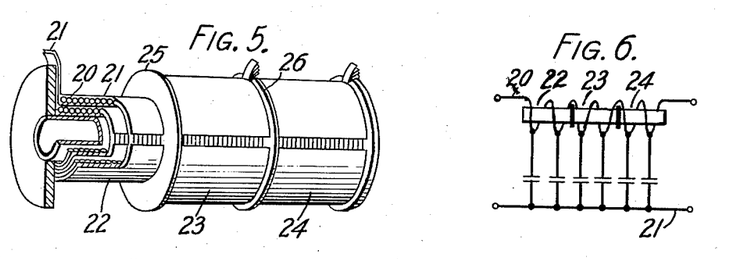
Fig. 5 shows in partial section an electrical impedance element which may be employed in filters of this invention.
Fig. 6 shows diagrammatically the nature of the impedance element of Fig. 5.

Figs. 2 to 4 show in general schematic form electrical filters in accordance with the invention, in which the branch impedances comprise lines having uniformly distributed impedance constants. These lines are of the series-shunt type and accordingly their properties are most readily examined by a consideration of the relative values of $Z_1$ and $Z_2$. The impedance elements may under certain conditions, for example in systems for extremely high frequencies, be actual lines or "Lecher wires," but in general it is more convenient to employ artificial lines in which the uniform distribution of the constants is obtained by special construction. A suitable form of impedance element is shown in Fig. 5 and will be described in detail later.

The filter of Fig. 2 comprises as series impedance elements uniform lines of characteristic impedance $K_1$ and over-all propagation constant $\theta_1$. These lines are connected into the filter circuit by one pair of terminals and have their remote terminals short circuited. The shunt impedances comprise open circuited lines of characteristic impedance $K_2$ and propagation constant $\theta_2$. The series and shunt impedances in this case have the values $$Z_1 = K_1 \tanh \theta_1,$$
and
$$Z_2 = K_2 \coth \theta_2. \quad (5)$$

Assuming that the lines are non-dissipative the characteristic impedances $K_1$ and $K_2$ are constant pure resistances, and the propagation constants $\theta_1$ and $\theta_2$ are pure imaginary quantities directly proportional to the frequency. The lines are inherently capable of transmitting all frequencies without attenuation and with a phase change directly proportional to the frequency. Let $B_1$ and $B_2$ be the phase angles corresponding to $\theta_1$ and $\theta_2$, the impedances $Z_1$ and $Z_2$ may then be written $$Z_1 = j K_1 \tan B_1$$
and
$$Z_2 = -j K_2 \cot B_2. \quad (6)$$

The condition for the existence of a pass band is that the quantity $$\frac{K_1}{K_2} \tan B_1 \tan B_2$$

lies between the values zero and $+4$. Since $B_1$ and $B_2$ increase continuously with frequency the values of $\tan B_1$ and $\tan B_2$ are zero periodically and range between the values minus infinity and plus infinity. Manifestly the conditions for the existence of a band must occur at an unlimited number of points in the frequency scale.

In accordance with the invention a uniform spacing of the transmission bands is obtained by proportioning the series and the shunt impedances so that both have the same propagation constant, or the same phase displacement. If the common value of the phase displacement be denoted by B the condition for the existence of a pass-band is $$0 \overset{=}{<} \frac{K_1}{K_2} \tan^2 B \overset{=}{<} 4. \quad (7)$$

The value of $\tan^2 B$ is always positive; for values of B equal to zero or any integral multiple of $\pi$ the value of $\tan^2 B$ is zero; for values of B equal to any odd multiple of $$\frac{\pi}{2}$$

the value of $\tan^2 B$ is infinite. Since the variation of $\tan B$ is symmetrical about its zero value and since B is directly proportional to the frequency the transmission band limits are spaced equally with respect to the frequencies for which $\tan^2 B$ is zero. The centers of the bands are thus harmonically spaced in the frequency scale, and all bands except the first are of equal width. The first band, since it centers theoretically at zero frequency is only half as wide as the others.

The width of the bands depends upon the ratio $$\frac{Z_1}{Z_2}$$

and may be increased by making $Z_1$ small with respect to $Z_2$.

At frequencies mid-way between the successive band centers $\tan B$ is infinite and hence the ratio $$\frac{Z_1}{Z_2}$$

and the propagation constant of the filter are infinite. The filter is thus characterized also by a series of points of infinite attenuation spaced in harmonic relation in the frequency scale.

In Fig. 3 a single section is shown of a filter that differs from that of Fig. 2 only in that the series impedance lines are open circuited and the shunt impedance lines are closed circuited. This change has the effect of interchanging the transmitting and attenuating bands as compared with the filter of Fig. 2. The condition for the occurrence of a transmission band is $$0 \overset{=}{<} \frac{K_1}{K_2} \cot^2 B \overset{=}{<} 4 \quad (8)$$

the series and the shunt lines being assumed to have equal propagation constants as before. An examination of Equation (8) in connection with the corresponding values of $Z_1$ and $Z_2$ shows that the filter has infinite attenuation at harmonically spaced frequencies for which B has the values $0$, $\pi$, $2\pi$, etc., and has equal transmission bands centered at frequencies for which B is an odd multiple of $$\frac{\pi}{2}.$$

The band widths are subject to control in the same manner as in the filter of Fig. 1.

In Fig. 4 the series branch includes two lines connected in series, one open circuited and the other short circuited. The shunt branch includes an open circuited line and a short circuited line connected in parallel. The effect of this combination is to increase the number of transmission bands occurring in a given frequency range. The values of the total series and shunt impedances in the general case are readily found with the help of Equations 5 and 6, and the transmission properties can then be determined by inserting the values so found in Equations (2) and (3). In the particular case illustrated, all four lines have the same propagation constant $\theta$, the closed circuit and open circuit series lines have characteristic impedances respectively $K_1$ and $K_2$, and the corresponding shunt lines have impedances respectively $K_3$ and $K_4$. Letting $\theta = j B$, as in the previous examples, the values of $Z_1$ and $Z_2$ are found to be $$Z_1 = j(K_1 \tan B - K_2 \cot B)$$

and $$\frac{1}{Z_2} = j\left(\frac{1}{K_4} \tan B - \frac{1}{K_3} \cot B\right). \quad (9)$$

The series impedance is infinite at frequencies for which B is zero, or any multiple of $$\frac{\pi}{2},$$

and is zero at intermediate frequencies determined by the equation $$\tan^2 B = \frac{K_2}{K_1}. \quad (10)$$

When $K_2$ is equal to $K_1$ the impedance is zero at frequencies spaced mid-way between the frequencies of infinite impedance.

The shunt impedance, conversely, is zero at frequencies for which B is zero or any multiple of $$\frac{\pi}{2},$$

and is infinite at frequencies for which $$\tan^2 B = \frac{K_4}{K_3}$$

In general there will be two transmission bands in the interval between the successive frequencies for which $Z_1$ is infinite, but these may be made confluent by so proportioning the characteristic impedances of the several lines that the frequencies for which $Z_1$ is zero coincide with the frequencies for which $Z_2$ is infinite. The necessary relationship is $$\frac{K_1}{K_2} = \frac{K_3}{K_4}. \quad (11)$$

The location of the band confluence is determined by the ratio $$\frac{K_1}{K_2},$$

and the width of the band by this ratio and the ratio $$\frac{K_3}{K_4}$$

jointly, the latter ratio being a determining factor of the ratio $$\frac{Z_1}{Z_2}.$$

When $K_1$ and $K_2$ are equal and $K_4$ and $K_3$ are also equal the bands are harmonically spaced and are of uniform width.

Fig. 5 shows a particular structure which has been found to give characteristics very closely approximating a uniform line of distributed series inductance and shunt capacity. This structure comprises a solenoid of wire 20 with tin foil 21 wrapped between layers so that the capacity between any turn and the foil is the same as between every other turn and the foil. A gap is left in the foil so that it will not act as a short circuited turn. Of course, this type of structure departs considerably from the ideal because of the coupling between turns. In the structure of Fig. 5 this effect is to a large extent eliminated by winding the coil in three sections 22, 23 and 24 separated by fibre washers 25 and 26, and connecting the middle section 23 in series opposing relation to the other two sections, as indicated in Fig 6. In some cases it may be desirable to use still more sections to neutralize the mutual inductance between coils to a still greater extent. This type of coil is connected in the filter structure by connecting one end of the winding and the foil in the desired arm and connecting the other end of the coil to the tin foil if a short circuited line is desired, or leaving it free if an open circuited line is desired.

Figure 7:
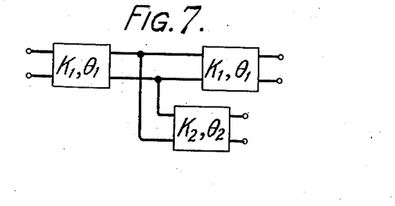
Figs. 7, 8 and 9 show additional filter structures embodying the invention.
Figure 8:
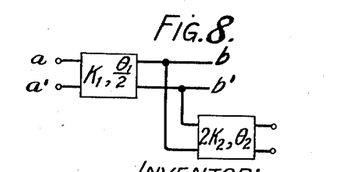

Another manner of using uniform lines of different characters to provide a filter structure in accordance with the invention is illustrated schematically in Figs. 7 and 8. In Fig. 7 the main transmission channel is a uniform line of characteristic impedance $K_1$. It is divided into equal sections, each having an over-all propagation constant $\theta_1$, by shunt impedances consisting of line elements of impedance $K_2$ and propagation constant $\theta_2$. In the figure the remote terminals of the shunt line are open circuited, but other modes of termination may be used. As will be seen later this general type of structure is of particular interest in connection with acoustic wave filters.

The transmission characteristics may be expressed in terms of the open circuit and closed circuit impedance of the symmetrical section obtained by cutting the system at the mid-points of two successive line sections, the section so obtained being of the mid-series type. The transmission formulæ are, however, more easily developed in terms of the impedances of the half section shown in Fig. 8, which has been obtained by dividing the system at the middle of a line section and splitting the adjacent shunt impedance into two parts.

If $X_a$ and $Y_a$ denote the impedances measured at the terminals $a, a'$ with the terminals $b, b'$ respectively open and closed a quantity of the nature of a propagation constant is given by the equation $$T = \tanh^{-1}\sqrt{\frac{Y_a}{X_a}}. \quad (12)$$

The quantity T is termed the "image transfer constant". Its significance has been fully discussed in the article by Zobel already cited, for the present purposes it is sufficient to state that the image transfer constant of the half section shown in Fig. 8 is equal to half the propagation constant of a full section of the system. From this it follows that $$\tanh \frac{P}{2} = \sqrt{\frac{Y_a}{X_a}} \quad (13)$$

where P denotes the propagation constant of one section of the filter.

The mid-series, or mid-line, characteristic impedance K is given by the equation $$K = \sqrt{X_a Y_a}. \quad (14)$$

This equation in reality gives the value of the "image impedance" of the half section for the terminals $a, a'$, the "image" impedance being defined as the impedance that should be connected to the terminals to prevent wave reflection occurring there. Obviously it is the same thing in this case as the mid-series characteristic impedance of the filter.

The values of $X_a$ and $Y_a$ are readily found by means of well known transmission formulæ. They are as follows:

$$X_a = K_1 \frac{Z_r \cosh \frac{\theta_1}{2} + K_1 \sinh \frac{\theta_1}{2}}{Z_r \sinh \frac{\theta_1}{2} + K_1 \cosh \frac{\theta_1}{2}}$$

and (15)

$$Y_a = K_1 \tanh \frac{\theta_1}{2},$$

in which $Z_r$ denotes the impedance of the shunt branch. For the section shown in the figure $Z_r$ has the value.

$$Z_r = 2K_2 \coth \theta_2,$$

but with other types of shunt impedance or other modes of terminating the shunt branch lines the value may be different.

Substituting the values of $X_a$ and $Y_a$ given by Equations (15) in Equations (13) and (14) leads to the following equations for the propagation constant and the characteristic impedance of the line, $$\text{Tanh} \frac{P}{2} = \sqrt{\frac{1 + \frac{Z_r}{K_1} \tanh \frac{\theta_1}{2}}{1 + \frac{Z_r}{K_1} \coth \frac{\theta_1}{2}}} \quad (16)$$

$$K = K_1 \sqrt{\frac{1 + \frac{K_1}{Z_r} \tanh \frac{\theta_1}{2}}{1 + \frac{K_1}{Z_r} \coth \frac{\theta_1}{2}}} \quad (17)$$

The shunt impedance in the general case in accordance with the invention comprises a uniform line, or a combination of lines, terminated in such a way as to produce large reflection effects, or in other words to exhibit periodic resonance effects. The value of the impedance $Z_2$ therefore ranges periodically from minus infinity through zero to plus infinity and so has a tendency to produce a multiplicity of transmission bands.

An examination of Equations 16 and 17, bearing in mind that $$\tanh \frac{P}{2}$$

is imaginary and K is real in a transmission band, shows that a regular arrangement of the bands requires a definite relationship between the phase angles of the component lines. The relationship that gives rise to a series of equal bands harmonically spaced is, in the case illustrated, found to be that the bridging lines should have half the phase displacement of each line section, or $$\theta_2 = \frac{1}{2} \theta_1.$$

Substituting the value of $Z_r$ obtained by this assumption in Equations (16) and (17), and writing the impedances as before in terms of the phase displacement, the equations become $$\text{Tanh} \frac{P}{2} = \sqrt{\frac{1 + \frac{2K_2}{K_1}}{1 - \frac{2K_2}{K_1} \cot^2 \frac{B_1}{2}}} \quad (18)$$

and $$K = K_1 \sqrt{\frac{1 - \frac{K_1}{2K_2} \tan^2 \frac{B_1}{2}}{1 + \frac{K_1}{2K_2}}} \quad (19)$$

From these equations it is seen that the band limits are defined by the equation $$\tan^2 \frac{B_1}{2} = 2 \frac{K_2}{K_1}.$$

The bands center at the frequencies for which $$\tan^2 \frac{B_1}{2}$$

is zero and the limits are spaced equally above and below these frequencies. This follows from the fact that $B_1$ is directly proportional to the frequency and from the symmetry of $$\tan \frac{B_1}{2}$$

about its zero values. As in the previous examples, the uniform width and the uniform spacing of the bands is the result of the proportioning of the lines to effect the confluence of pairs of bands that would otherwise appear separate.

The attenuation is infinite when the bridging line impedance is zero, that is, when $$\tan \frac{\theta_1}{2}$$

is infinite. The frequencies of infinite attenuation are spaced midway between the successive band centers and hence are in harmonic relation to each other.

If the bridging line instead of being open circuited, as shown in the figure, is closed at its remote terminals a filter of converse properties is obtained. A short analysis along the foregoing lines will show that closing the bridging line terminals results in an interchange of the transmission and attenuating ranges. The frequencies of infinite attenuation occur when $$\tan \frac{B_1}{2}$$

is zero and the band centers are placed at the frequencies for which $$\tan \frac{B_1}{2}$$

is infinite.

Figure 9:
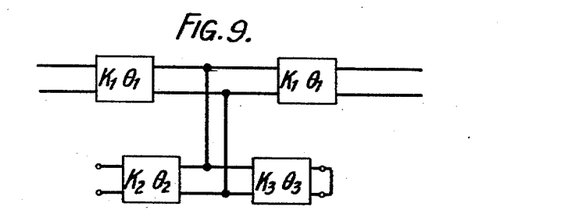

In Fig. 9 the shunt impedance consists of a pair of line elements connected in parallel, the one having a characteristic impedance $K_2$ and propagation constant $\theta_2$ and being open circuited, and the other, which is short circuited having constants $K_3$ and $\theta_3$. For the case in which $$\theta_2 = \theta_3 = \frac{\theta_1}{2}$$

the value of $Z_r$ is given by $$Z_r = \frac{2 K_2 K_3}{jK_3 \tan \frac{B_1}{2} - jK_2 \cot \frac{B_1}{2}}.$$

The mid-series characteristic impedance of the system is found from Equation 17 to be $$K = K_1 \sqrt{\frac{2 + \frac{K_1}{K_3} - \frac{K_1}{K_2} \tan^2 \frac{B_1}{2}}{2 + \frac{K_1}{K_2} - \frac{K_1}{K_3} \cot^2 \frac{B_1}{2}}}. \quad (20)$$

The value of $K$ is imaginary when $$\frac{K_1}{K_2} \tan^2 \frac{B_1}{2}$$

is greater than $$2 + \frac{K_1}{K_2}$$

and also when $$\frac{K_1}{K_3} \cot^2 \frac{B_1}{2}$$

is greater than $$2 + \frac{K_1}{K_3}.$$

These conditions occur alternately as the frequency increases. The attenuation is infinite for values of $$\frac{\theta_1}{2}$$

equal to zero or any multiple of $$\frac{\pi}{2},$$

corresponding to resonance of one or other of the two shunt lines. If the shunt line characteristic impedances are unequal the bands are not, in general, harmonically spaced, but by making the two shunt line impedances equal a uniform series of transmission bands and attenuating bands is secured. Under these conditions the band limits are determined in successive pairs by the equations $$\tan^2 \frac{B_1}{2} = 1 + \frac{2 K_2}{K_1}$$

and $$\cot^2 \frac{B_1}{2} = 1 + \frac{2 K_2}{K_1}$$

in which $K_2$ is the common impedance of the two shunt lines.

Figure 10:
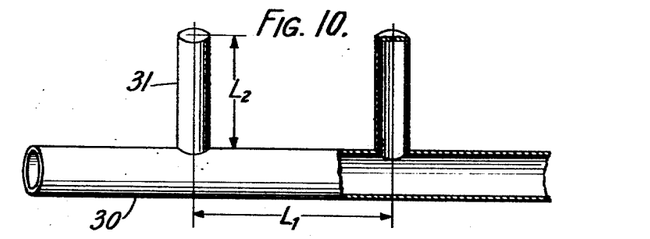
Figs. 10, 11 and 12 illustrate the embodiment of the invention in acoustic wave filters.
Figure 11:
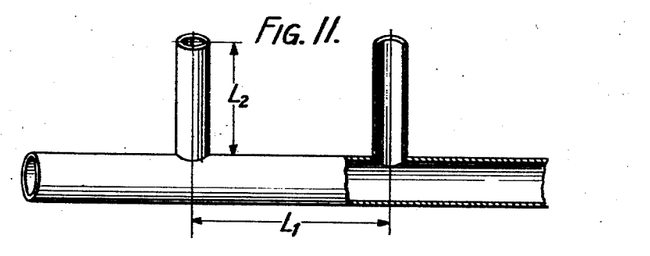
Figure 12:
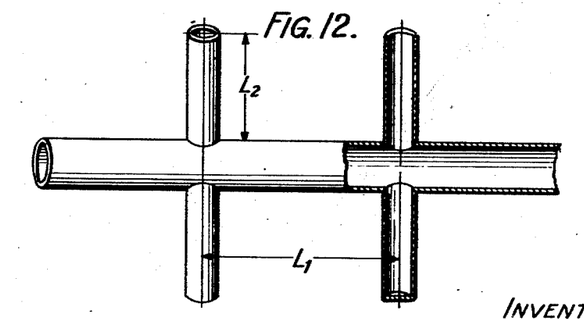

The acoustic filters of Figs. 10, 11 and 12, are of the same general type as the filters shown in Figs. 7 and 9. The main transmission channel is a tubular sound conduit and the shunting impedances are in the form of branching tubes which may be either closed or open at their remote ends.

The transmission of sound waves in a tubular conduit is governed by the same general principles as the transmission of electric waves in an electrical line. The mass of the air is effective to store kinetic energy and its elasticity permits the storage of potential energy. The uniform distribution of these properties in a tubular conduit gives rise to space distributions of pressure and velocity which at certain frequencies is productive of standing waves or resonance. These phenomena are well known both in electrical and mechanical systems.

In applying the general principles to acoustic systems it is most convenient to consider the motion of the air as consisting of a volumetric flow under the action of a difference of pressure intensity. This procedure has the advantage that the conditions at the junctions of branch lines or at the junctions of unequal sections of the main channel are expressed by very simple laws which are exactly analogous to the well known Kirchoff's laws for electrical circuits. The wave motion may also be expressed in terms of the linear velocity of the air particles and the pressure intensity, or alternatively the total pressure over the cross section of the sound conduit, but in these cases formula for the conditions at branch points are slightly more complicated.

Defining the volumetric velocity as the number of cubic centimeters of air per second traversing a given cross section of the sound conduit, it is readily seen that the sum of the volumetric velocities at any branch point is zero, since as much air must flow away from the point as flows towards it. Furthermore the flow of air in each of the branches takes place under the difference of pressure between the branch point and the ends of the branches, that is, under the excess pressure at the branch point over the normal pressure of the system, usually the atmospheric pressure.

Wave motion in any conduit is accompanied by some dissipation, due principally to the viscosity of the air whereby the walls of the conduit exert a drag upon the air. However this dissipation is very small except where the sound conduit is extremely narrow and need not be taken into account in determining the principal characteristic features of wave transmission in acoustic systems.

The ratio of the excess pressure at a point in an acoustic system, measured in dynes per square centimeter, to the volumetric velocity at that point is termed the "acoustic impedance".

In a sound conduit of uniform cross section wave motion is propagated with a velocity substantially equal to the velocity of sound in free air. There is a slight difference due to the effect of viscosity, but, as already stated, this may be ignored for practical purposes. Since the dissipation is negligible the waves may be assumed to be propagated without attenuation, and since the conduit is uniform the phase displacement in any given length will be proportional to the frequency. The uniform sound conduit is thus seen to be completely analogous to the uniform electrical lines of the previous examples.

The acoustic impedance of an infinitely long uniform conduit, that is, the characteristic acoustic impedance denoted by $K_a$, is given by the equation $$K_a = \frac{1}{S}\sqrt{P_0 \gamma \rho} \text{ c.g.s. units} \quad (21)$$

in which
  $P_0$ = the atmospheric pressure in dynes per $cm^2$,
  $\rho$ = the density of air at the pressure $P_0$,
  $\gamma$ = the ratio of the specific heats of air at constant pressure and at constant volume, and
  $S$ = the cross sectional area in $cm^2$ of the conduit.

The phase displacement, denoted by B, in a length $l$ of the conduit is given by the equation $$B = 2\pi f \frac{l}{c} = 2\pi f l \sqrt{\frac{\rho}{P_0 \gamma}} \quad (22)$$

in which
  $f$ = the frequency, and
  $c$ = the velocity of sound in air in cm. per second.

If the remote end of the sound conduit is closed the velocity there is necessarily zero. The stopped conduit is therefore an open circuited transmission line. If the remote end is open to the air the flow of air at the exit is unimpeded, and the line is therefore in the short circuited condition.

The values of the characteristic impedance and the phase displacement given by Equations 21 and 22 enable Equations 18, 19 and 20 to be applied directly to the determination of the properties of the acoustic filters of Figs. 10, 11 and 12.

In Fig. 10 the filter comprises a main tubular sound conduit 30 with tubular side branches of length $L_2$ spaced at intervals of length $L_1$ along the main tube. The side branches are stopped at their outside ends thereby giving them an open circuit termination. The system is completely analogous to that of Figs. 7 and 8 and the formulæ developed in connection with that system may be applied directly.

The characteristic impedance of the main line sections is given by $$K_1 = \frac{1}{S_1}\sqrt{P_0 \gamma \rho},$$

and its phase displacement is $$B_1 = 2\pi f \frac{L_1}{c},$$

in which $S_1$ is the cross sectional area of the tube 30. Similar formulæ apply to the side branches, and if the cross section of these is denoted by $S_2$ the following relationships at once appear, $$\frac{K_1}{K_2} = \frac{S_2}{S_1},$$

and $$\frac{B_1}{B_2} = \frac{L_1}{L_2}.$$

The requisite relationship between the side branches and the main line sections to provide a series of harmonically spaced uniform bands is $$B_2 = \frac{1}{2} B_1 \text{ or } L_2 = \frac{1}{2} L_1.$$

Under this condition the mid-series characteristic impedance of the filter and its propagation constant per section are given by $$K = K_1 \sqrt{\frac{1 - \frac{1}{2}\frac{S_2}{S_1}\tan^1 \frac{B_1}{2}}{1 + \frac{1}{2}\frac{S_2}{S_1}}} \quad (23)$$

and $$\text{Tanh}\frac{P}{2} = \sqrt{\frac{1 + 2\frac{S_1}{S_2}}{1 - 2\frac{S_1}{S_2}\cot^2\frac{B_1}{2}}} \quad (24)$$

The centers of the transmission bands are spaced at frequencies for which $$\tan \frac{B_1}{2}$$

is zero, i. e. for which $$\frac{B_1}{2}$$

has the values $0, \pi, 2\pi$, etc., and the attenuation is infinite at frequencies for which $$\frac{B_1}{2}$$

is an odd multiple of $$\frac{\pi}{2}.$$

The first frequency of infinite attenuation is given by $$f_1 = \frac{c}{2L_1},$$

and the band limits are determined by the equation $$\tan^2 \frac{B_1}{2} = 2 \frac{S_1}{S_2}.$$

The width of the band is evidently subject to control by varying the ratio of the two cross sectional areas.

The filter of Fig. 10 is of the low-pass type in the sense that the first band is centered theoretically at zero frequency, this band being in consequence only half as wide as the others. The converse type of filter is shown in Fig. 11 in which the side branches are open at their ends corresponding to a short circuit termination. In this modification, assuming the same relation as before to exist between the side branch lengths and their separation the attenuation is infinite at zero frequency and at frequencies for which $$\frac{B_1}{2}$$

is any integral multiple of $\pi$. The bands are centered at frequencies for which $$\frac{B_1}{2}$$

is any odd multiple of $$\frac{\pi}{2},$$

and the band limits are determined by the condition $$\cot^2 \frac{B_1}{2} = 2 \frac{S_1}{S_2}.$$

It is characteristic of these filters that if the side branches are made with cross sectional areas that are very small relatively to the area of the main path, the attenuating ranges will be very narrow, and the attenuation in these ranges will be very great. Filters constructed in this way are of particular utility for removing harmonic tones, such for example as may arise from the harmonics of a power current, from a speech transmission system without seriously affecting the efficiency of the system for the transmission of speech.

Fig. 12 shows an acoustic filter in which there are two tubular side branches at each branch point, the one being stopped and the other open at the remote end. This filter is of the same type as that shown in Fig. 9 and the formulae developed in connection with that filter apply also to Fig. 12. For uniform spacing and uniform width of the transmission bands the side branches should each be of half the length of the main conduit sections and should have the same cross sectional area as each other. The attenuation is infinite at frequencies for which the phase displacement $$\frac{B_1}{2}$$

is zero or any multiple of $$\frac{\pi}{2},$$

there being twice as many such frequencies for filters of this type as for those of Figs. 10 and 11. The band limits are determined in pairs by the conditions $$\tan^2 \frac{B_1}{2} = 1 + \frac{S_1}{S_2},$$

and $$\cot^2 \frac{B_1}{2} = 1 + \frac{S_1}{S_2},$$

in which $S_1$ is the main conduit cross sectional area and $S_2$ the cross sectional area of each side branch.

The inherent selective properties of any broad band filter require for their realization in practice that the filter be terminated, at one end at least, in a resistive impedance substantially equal to the filter characteristic impedance throughout the transmission range of frequencies. Since the characteristic impedance is variable with frequency an exact result is not obtainable, but by matching the terminal impedance approximately to the value of the characteristic impedance at the mid-frequency of the transmission band the actual transmission characteristics are substantially the same as the theoretical characteristics. The formulae given in the foregoing paragraphs enable the proper values of the terminal impedances to be readily computed. In the case of acoustic filters the manner of terminating the filter will depend upon the use to which the filter is put. If used in connection with a sound reproducer it may be connected at one end to an exponential horn, which by virtue of its uniform transmission and radiation efficiency has an impedance that is substantially a constant resistance. At the other end it may be coupled to the sound reproducing device, for example a gramophone sound box or a telephone receiver, in the manner described in British Patent 230,876 issued March 9, 1925, in which case the connected mechanical or electrical system may constitute the proper terminal impedance.

What is claimed is:

1. A wave filter comprising a wave transmission line of recurrent structure, the recurrent sections of said line being composed of portions of lines having distributed impedance constants and having linear frequency-phase displacement characteristics, certain of said component lines being disposed in shunt to the main transmission channel of the filter and certain being included in series therein, and said component lines having phase displacement constants proportioned with respect to one another to provide a series of uniform transmission bands centered about a series of harmonically spaced frequencies.

2. A multipass-band wave filter comprising a wave transmission line of recurrent structure, the recurrent sections of said line being composed of portions of substantially non-dissipative lines having uniformly distributed impedance constants, certain of said component lines being included in the main transmission channel of the filter, and certain being disposed in shunt thereto, and the effective lengths of said component lines being proportioned to give an integral numerical relationship between their phase displacement constants.

3. A multipass-band wave filter comprising a wave transmission line of recurrent structure, the recurrent sections of said line being composed of portions of substantially non-dissipative lines having uniformly distributed constants, certain of said component lines being included in the main transmission path of the filter, and certain being disposed as branch paths in shunt thereto, said shunt lines being terminated to provide full wave reflection, and having phase displacement constants in a constant integral relation to the phase constants of the series component lines.

4. A multipass-band wave filter comprising a wave transmission line of recurrent structure the recurrent sections of said line being composed by portions of substantially non-dissipative lines having uniformly distributed impedance constants, certain of said component lines being included in the main transmission path of the filter and certain being disposed as branch paths in shunt thereto, the characteristic impedances and the phase constants of said component lines having precomputed values dependent upon the limiting frequencies of a desired series of uniform transmission bands and upon a series of frequencies of infinite attenuation, so that the filter will transmit freely waves of all frequencies within the limits of said bands and will attenuate strongly frequencies in the attenuating ranges separating said bands.

5. A multipass-band filter comprising a wave transmission line of recurrent structure, the recurrent sections of said line comprising portions of uniform lines alternately disposed in series and shunt relation to the main transmission path of the filter, said component lines having phase-shift constants directly proportional to their effective lengths, and the effective lengths of said lines being proportioned with respect to each other and with respect to a preassigned series of harmonically related frequencies, so that the filter will suppress waves of said frequencies with substantially infinite attenuation while transmitting freely waves in frequency bands located between said frequencies.

6. A multipass-band wave filter comprising a wave transmission line having uniformly distributed impedance constants and having connected thereto at equal intervals branch paths comprising lines having uniformly distributed impedance constants, the phase constants of the branch paths and of the sections of the wave transmission line being proportioned with respect to each other and to frequencies in a desired harmonic series, to provide a series of transmission bands the mid-frequencies of which coincide with the frequencies in the desired series.

7. A wave filter in accordance with claim 6 in which the phase displacement constants of the branch lines are integrally related to the phase displacement constants of the transmission line sections.

8. A wave filter in accordance with claim 6 in which the phase displacement constants of the branch lines are equal to one half the phase displacement constants of the transmission line sections.

9. A wave filter in accordance with claim 6 in which the branch lines are terminated to produce full wave reflection at their ends remote from the transmission line.

10. A wave filter in accordance with claim 6 in which the branch paths comprise pairs of similar lines connected in parallel, one of each pair being short circuited at its remote end, and the other being open circuited.

11. A multipass-band acoustic wave filter comprising a main sound conduit of uniform cross sectional area, and branch conduits connected thereto at uniform intervals along the axis, said branch conduits being of uniform cross-section and of length equal to half the length of the sections of the main conduit between the branch points.

12. An acoustic wave filter in accordance with claim 11 in which the branch conduits are terminated to produce full wave reflection.

13. An acoustic wave filter in accordance with claim 11 in which there are two equal branch conduits connected at each branch point, one of said branch conduits being open to the air at its remote end and the other being closed.

14. An acoustic wave filter in accordance with claim 11 in which the branch conduits are of small cross-section relative to the cross-section of the main conduit, whereby the filter is adapted to attenuate sharply harmonic waves of an undesired frequency while passing freely substantially all other waves.

15. A wave filter of the recurrent type comprising a group of lines having linear phase shift characteristics employed as two terminal impedance elements effectively connected in shunt to the line of propagation of energy, and a second group of lines having linear phase shift characteristics alternately disposed with respect to the lines of said first group and differently arranged with respect to the line of propagation of energy, the phase constants of the lines of said first group being so proportioned with respect to the phase constants of the lines of said second group as to give a series of harmonically related bands.

16. A filter according to claim 15 in which the phase constants of the lines of the first group are equal to the phase constants of the lines of the second group.

17. A wave filter section comprising arms arranged in series and shunt relation respectively to the line of propagation of energy, each of said series arms comprising a portion of a line having uniformly distributed impedance elements and having only one end connected into the respective arm, so that it is effectively a series impedance, one of said arms comprising a line having a linear frequency phase shift characteristic having only one end effectively connected in the arm.

18. A wave filter section according to claim 17 in which series and shunt arms comprise lines having linear frequency versus phase shift characteristics and having only one end effectively connected in the respective arms, so that said lines act as two-terminal impedances.

19. A wave filter section comprising impedance arms effectively in shunt and series relation respectively to the line of propagation of energy, one of said series arms comprising a line of distributed impedance characteristics having only one end effectively connected thereto so that it is effectively a series impedance, and the other end terminated to give said filter section a propagation characteristic comprising a series of alternate transmission and suppression bands.

20. A wave filter section comprising two impedance arms effectively in shunt and series relation, respectively, to the line of propagation of energy, each of said arms comprising a line of distributed impedance characteristics having only one end effectively connected in the respective arm, the other end of one of said lines being effectively open-circuited and the other end of the other of said lines being effectively short-circuited.

21. A wave filter section comprising impedance arms effectively in shunt and series relation, respectively to the line of propagation of energy, each of said arms comprising a line of distributed impedance characteristics having only one end effectively connected in the respective arm, so that said lines act as two-terminal series and shunt impedances, the phase constants of said lines being equal.

22. A multi-band wave filter comprising a wave transmission line of recurrent structure, the recurrent sections of said line being composed of portions of substantially non-dissipative lines having uniformly distributed impedance constants, certain of said component lines being included in the main transmission path of the filter, and certain being disposed as branch paths in shunt thereto, said shunt lines being terminated to provide full wave reflection, and having phase displacement constants proportioned to make said shunt lines resonant at frequencies of a pre-assigned harmonic series, so that said frequencies will be greatly attenuated while waves in frequency bands located between said frequencies will be freely transmitted.

23. A multi-band acoustic wave filter comprising a main sound wave propagating channel having disposed at regular intervals in shunt thereto, side branches consisting of uniform tubes having a length proportioned to make said side branches resonant at a pre-assigned series of harmonically related frequencies, so that waves of said frequencies will be greatly attenuated while waves in frequency bands located between said frequencies will be freely transmitted.

In witness whereof, I hereunto subscribe my name this 23d day of June, A. D., 1927.

WARREN P. MASON.